106-90

CROSS REFERENCE

EXAMINER

Patented May 17, 1949

2,470,505

UNITED STATES PATENT OFFICE 2,470,505

SLOW SETTING CEMENT AND PROCESS OF MAKING THE SAME

Norman C. Ludwig, Chicago, Ill., assignor to Universal Atlas Cement Company, a corporation of Indiana No Drawing. Application June 28, 1946, Serial No. 680,091

7 Claims. (Cl. 106—92)

This invention relates to Portland or Portland type cements with retarded setting rates and to methods of retarding the rate of set of these cements, especially when they are to be subjected to temperatures above normal during the period of setting, such as in the cementing of oil wells.

In the cementing of oil wells and similar operations, it is customary to mix Portland cement with about 40 per cent of water by weight, to introduce the resulting grout or slurry into the well, and to pump it to the desired location. In present oil well drilling practice, with many wells 6,000 to 12,000 feet or more in depth, long periods of time often are required for pumping, and high temperatures are encountered which greatly accelerate the setting of ordinary Portland cement.

Ordinary Portland cement, when mixed with water to form a paste and subjected to elevated temperatures, begins to hydrate immediately and sets in a short time to an extent that its utility in the cementing of deep oil wells and similar work is quite limited.

Furthermore, in the customary practice of pumping the grout down through the well casing and then forcing it upward around the lower end of the casing to the desired final position, the grout is required to pass through narrow channels which tend to prevent proper final placement if stiffening has taken place. It is a prime requisite of cements for such use that they have the property of remaining fluid and pumpable for long periods of time at elevated temperatures before setting begins.

It also is important in oil well cementing to have a cement of sufficient fineness to avoid separation of cement from the water in the grout. Both early strength and ability to retain mixing water are increased with increases in fineness of the cement. Increases in fineness, however, also increase the setting rate of the cement because of the increase in reactive surface of a given weight of cement. A particular problem in oil well and similar cements, therefore, has been the production of a cement which could be finely ground and still have a sufficiently slow rate of hydration at elevated temperature to enable grout to be pumped to the desired location in a deep oil well.

One object of the present invention is the provision of finely ground Portland cement capable of setting with a high strength but having a retarded rate of hydration especially at elevated temperatures.

A further object is the provision of methods of retarding the rate of hydration at normal and high temperatures of conventional Portland cements even though they may be very finely ground.

A still further object is to provide materials for admixture with Portland cement which readily are dispersed in the mixing water, which render a grout of the cement and water more fluid at normal and high temperatures and which retard the setting rate of the cement without material impairment of its other physical properties, such as strength and density, after setting has taken place.

The present invention adds to the foregoing objects the control of the rate of hydration of conventional Portland cements, in a constant manner to give approximately equal stiffening times at temperatures encountered in deep oil wells, thereby permitting a close control of the setting properties.

It is known that small amounts of certain substances added to cement, the mixing water, or to a mixture of cement and water, greatly retard the rate of stiffening or set of cement slurries at elevated temperatures. However, after set has begun, the rate of set is rapid, so that the early strength is comparable with that of a normal paste. Andes et al. Patent No. 2,429,211 discloses such an addition agent and gives results showing retardation of the rate of stiffening of cement slurries coupled with absence of initial stiffening of the slurries to any objectionable extent. The particular additive disclosed is small amounts of starches from various sources that have been modified in a particular manner. In accordance with the present invention, it has been found that further improvements are obtained by combining addition agents into what is, in effect, a new retarding composition that offers new and improved results over previous proposals, in that it produces approximately equal retardation in the rate of stiffening of the slurry at the various different temperatures encountered in oil wells.

More specifically, the present invention obtains the improved results of approximately equal retardation of the rate of stiffening at such different temperatures encountered in oil well operations, by the conjoint use of maleic acid and modified starches of commerce. The preferred modified starches are those known as thin boiling starches, but oxidized starches may also be used. The thin boiling starches are generally manufactured by (1) digesting raw corn starch in acidulated water, (2) forming a starch cake from the treated material, and (3) drying and processing the cake in an oven at approximately 200 degrees F.

During processing, the starch granules undergo changes which result in products that are soluble in cold water. The solubility in cold water varies with variations in the manufacturing process and is generally considered a measure of the amount or degree of processing. The modified starches having cold water solubilities of about 0.5 per cent to about 65 per cent are the most suitable for the purpose of this invention.

The particular procedures for producing thin boiling and oxidized starches are well-known in the art, are not part of the present invention, and therefore need not be referred to herein in greater particularity.

The maleic acid (COOH.HC:CH.COOH) employed is the technical grade of the material.

The modified starches employed are the products procurable on the open market under the designations "thin boiling starches" and "oxidized starches." A typical batch analysis is as follows:

| Percent Cold Water Solubility | Scott Paste Fluidity (sec. per 100 cc.) | pH (Concentration 20%) |
|---|---|---|
| 20-30 | 45-60 | 5.4-6.6 |

A cold water solution of this material responds to the starch-iodine test, showing the characteristic deep blue color of starch-iodine.

A typical oxide analysis of a suitable Portland type cement suitable for oil well use is as follows, the percentages being by weight:

| | | |
|---|---|---|
| SiO$_2$ | per cent | 21.7 |
| Al$_2$O$_3$ | do | 4.9 |
| Fe$_2$O$_3$ | do | 4.2 |
| CaO | do | 64.6 |
| MgO | do | 1.1 |
| SO$_3$ | do | 1.7 |
| Loss on ignition | do | 1.00 |
| Specific surface (Wagner) | | 1180 |

As illustrations for demonstrating the effectiveness of the addition of the improved composition of the present invention, pumpability tests were made with a Halliburton consistometer, as described in United States Patent No. 2,122,765 to John E. Weiler, issued July 5, 1938, and a pressure consistometer as described in Technical Publication No. 1207, American Institute of Mining and Metallurgical Engineers. The Halliburton consistometer was used in making tests at 100°, 140°, 180° and 200° F. and the pressure consistometer was used in making tests at 220° F.

The retardation properties were measured at different temperatures as indicated in the following illustrative examples. For ready comparison the examples show the results using maleic acid alone as the additive (Example I), modified starch alone (Example II) and maleic acid plus modified starch as the additive (Example III). In all cases the amount of the additive is stated as the percentage by weight of the amount of Portland cement.

A slurry composed of 100 parts by weight of cement and 40 parts by weight of water was used in all tests. The retarders were added to the mixing water and thoroughly dissolved or dispersed before the cement was added. However, the retarder may as well be added to the cement itself prior to addition of the water.

The consistometer test results obtained on the neat slurry (no additive) are shown below in Table I, and serve as a basis for comparing the other test results.

In each of Tables I—VI, inclusive, there are set out the results of consistometer tests on different slurry compositions at five different temperatures, namely, 100°, 140°, 180°, 200° and 220° F.

TABLE I

*Consistometer tests—40% slurry (neat)*

[Slurry viscosity ("poises"×10$^{-1}$)]

| Temp., °F. | 15 Min. | 30 Min. | 1 Hr. | 2 Hr. | 3 Hr. | 4 Hr. | 5 Hr. | 6 Hr. | Stiffening Time | |
|---|---|---|---|---|---|---|---|---|---|---|
| | | | | | | | | | Hr. | Min. |
| 100 | 0.80 | 0.80 | 0.90 | 0.90 | 1.20 | 2.10 | 4.40 | 7.60 | 6 | 42 |
| 140 | 0.90 | 0.90 | 0.90 | 2.20 | 10.00 | | | | 3 | 00 |
| 180 | 1.00 | 1.20 | 1.30 | 5.60 | | | | | 2 | 01 |
| 200 | 1.60 | 1.70 | 2.00 | | | | | | 1 | 47 |
| 220 | 2.10 | 2.70 | 3.10 | | | | | | 1 | 32 |

Maleic acid added to the cement slurry reacts as a retardant and lengthens the stiffening times. This reaction is not uniform at all temperatures, however, as shown in the following illustrative example, Example I.

EXAMPLE I

*Stiffening times—40% slurry (maleic acid)*

| Additive | Percent | Temperatures | | | | | | | | |
|---|---|---|---|---|---|---|---|---|---|---|
| | | 100° F. | | 140° F. | | 180° F. | | 200° F. | | 220° F. | |
| | | Hr. | Min. | Hr. | Min. | Hr. | Min. | Hr. | Min. | Hr. | Min. |
| (Neat Slurry) | | 6 | 42 | 3 | 00 | 2 | 01 | 1 | 47 | 1 | 32 |
| Maleic Acid | 0.10 | 8 | 46 | 3 | 18 | 2 | 38 | 3 | 30 | 2 | 07 |
| Do | 0.20 | 9 | 24 | 3 | 54 | 3 | 09 | 7 | 08 | 3 | 19 |
| Do | 0.30 | 11 | 55 | 4 | 47 | 4 | 10 | 10 | 08 | 4 | 52 |

This retarder is most reactive at the temperatures in the range of 200 degrees F. and fairly reactive at temperatures in the range of 100 degrees F. At temperatures of 140 degrees F. and 180 degrees F., maleic acid is fairly unreactive.

Maleic acid reacts to give high slurry fluidity during the entire period of slurry mobility. This is shown below by the results of Table II.

TABLE II
*Consistometer tests—40% slurry*

[Slurry viscosity ("poises"×10⁻¹)]

| Temp., °F. | Maleic Acid, percent | 15 Min. | 30 Min. | 1 Hr. | 2 Hr. | 3 Hr. | 4 Hr. | 5 Hr. | 6 Hr. | Stiffening Time Hr. | Stiffening Time Min. |
|---|---|---|---|---|---|---|---|---|---|---|---|
| 100 | 0.30 | 0.40 | 0.50 | 0.60 | 0.60 | 0.70 | 0.70 | 0.80 | 1.00 | 11 | 55 |
| 140 | 0.30 | 0.40 | 0.60 | 0.70 | 0.70 | 1.80 | 4.30 | | | 4 | 47 |
| 180 | 0.30 | 0.70 | 0.90 | 1.10 | 1.00 | 1.00 | 6.70 | | | 4 | 10 |
| 200 | 0.30 | 1.00 | 1.50 | 1.80 | 2.10 | 2.20 | 2.00 | 1.80 | 1.70 | 10 | 08 |
| 220 | 0.30 | 0.80 | 1.50 | 2.20 | 2.20 | 1.60 | 1.60 | | | 4 | 52 |

In connection with the present invention, it has been found that modified starch produced as previously explained is an effective oil well cement retarder. The reactivity of the material at different temperatures is dependent upon the degree of conversion of the product. The modified starches having relatively high solubilities are most reactive at temperatures of 100 degrees F. to 140 degrees F., whereas those with relatively low solubilities are less reactive at these temperatures but tend to be more reactive at temperatures of 140 degrees to 200 degrees F.

However, there has not been found a modified starch that will react to give fairly equal stiffening times at temperatures of 140 degrees F., 180 degrees F. and 200 degrees F. While such a modified starch might be selected that will react to give approximately equal stiffening times at 180 degrees F. and 200 degrees F., the 140 degrees F. stiffening time will be shorter than desired. Also a product might be used that will react to give approximately equal stiffening times at 140 degrees F. and 180 degrees F., but then the 200 degrees F. stiffening time will be shorter than desired.

Modified starch of 20 per cent to 30 per cent water solubility, as described above, is a product of medium conversion and is more or less reactive at all temperatures in the range of 100 degrees to 220 degrees F. and higher.

The following illustrative example (Example II) is indicative of the reactivity of the modified starch at different temperatures, the values indicated showing the stiffening times at the designated different temperatures:

EXAMPLE II
*Stiffening times—40% slurry (modified starch)*

| Additive | Percent | 100° F. Hr. | 100° F. Min. | 140° F. Hr. | 140° F. Min. | 180° F. Hr. | 180° F. Min. | 200° F. Hr. | 200° F. Min. | 220° F. Hr. | 220° F. Min. |
|---|---|---|---|---|---|---|---|---|---|---|---|
| (Neat Slurry) | | 6 | 42 | 3 | 00 | 2 | 01 | 1 | 47 | 1 | 32 |
| Mod. Starch | 0.10 | 7 | 48 | 6 | 37 | 7 | 55 | 5 | 27 | 2 | 34 |
| Do | 0.12 | 8 | 45 | 9 | 02 | 10 | 05 | 6 | 43 | 2 | 48 |

These figures show that the modified starch is most reactive in the temperature range of 140 degrees F. to 180 degrees F. The modified starch retarder also reacts to give high slurry fluidity during the period of mobility of the slurry. This is shown by the following table, Table III.

TABLE III
*Consistometer tests—40% slurry (modified starch)*

[Slurry viscosity ("poises"×10⁻¹)]

| Temp., °F. | Mod. Starch, Per Cent | 15 Min. | 30 Min. | 1 Hr. | 2 Hr. | 3 Hr. | 4 Hr. | 5 Hr. | 6 Hr. | Stiffening Time Hr. | Stiffening Time Min. |
|---|---|---|---|---|---|---|---|---|---|---|---|
| 100 | 0.12 | 0.50 | 0.70 | 0.80 | 0.80 | 0.80 | 1.00 | 1.40 | 1.80 | 8 | 45 |
| 140 | 0.12 | 0.60 | 0.80 | 0.90 | 0.90 | 0.90 | 0.90 | 0.90 | 1.00 | 9 | 02 |
| 180 | 0.12 | 0.60 | 0.70 | 0.80 | 0.90 | 1.00 | 1.30 | 1.40 | 1.60 | 10 | 05 |
| 200 | 0.12 | 0.60 | 0.80 | 1.00 | 1.70 | 1.90 | 1.90 | 2.00 | 2.40 | 6 | 43 |
| 220 | 0.12 | 0.50 | 0.70 | 2.80 | 2.60 | | | | | 2 | 48 |

I am able to produce a retarding composition that will produce a high slurry fluidity during the period of mobility of the slurry, coupled with approximately equal retardation notwithstanding different temperatures, in accordance with the present invention, by the conjoint use of maleic acid and modified starch. I have found that these additions are compatible in mixtures effecting retardation of the cement slurry. Certain controls as indicated above are obtainable in accordance with the present invention by the use of the mixture that cannot be obtained with the individual compounds. It is found in practice that the relatively low reactivity of the maleic acid retarder at temperatures of 140 degrees F. and 180 degrees F. is compensated for by the relatively high reactivity of the modified starch retarder at these same temperatures. At 200 degrees F., the converse is true and compensation is maintained.

Using the percentages as listed below, it is found that the stiffening times at 140 degrees F., 180 degrees F., and 200 degrees F. are approximately equal. Typical results are shown in the following illustrative example, Example III.

140 degrees F., 180 degrees F., and 200 degrees F. can be made approximately equal, as pointed out above.

That modified starch and maleic acid are compatible is illustrated by the low slurry viscosities obtained in the tests noted below in Table IV:

TABLE IV

*Consistometer tests—40% slurry (mod. starch+maleic acid)*

[Slurry viscosity ("poises"×10⁻¹)]

| Temp., °F. | Additive | Per Cent | 15 Min. | 30 Min. | 1 Hr. | 2 Hr. | 3 Hr. | 4 Hr. | 5 Hr. | 6 Hr. | Stiffening Time Hr. | Stiffening Time Min. |
|---|---|---|---|---|---|---|---|---|---|---|---|---|
| 100 | Mod. Starch plus Maleic Acid | 0.06 0.10 | 0.60 | 0.70 | 0.70 | 0.80 | 0.80 | 1.40 | 2.30 | 3.90 | 7 | 40 |
| 140 | do | 0.10 | 0.70 | 0.80 | 0.80 | 0.80 | 1.40 | 2.90 | 6.80 | | 5 | 10 |
| 180 | do | 0.10 | 0.70 | 0.80 | 0.90 | 1.20 | 1.40 | 1.50 | 2.70 | | 5 | 40 |
| 200 | do | 0.10 | 0.90 | 1.10 | 1.60 | 1.80 | 1.70 | 1.60 | 1.70 | | 5 | 52 |
| 220 | do | 0.10 | 0.80 | 1.30 | 2.20 | 1.70 | 6.30 | | | | 3 | 15 |

EXAMPLE III

*Stiffening times—40% slurry*

| Additive | Percent | Temperatures 140° F. Hr. | 140° F. Min. | 180° F. Hr. | 180° F. Min. | 200° F. Hr. | 200° F. Min. |
|---|---|---|---|---|---|---|---|
| Mod. Starch plus Maleic Acid | 0.06 0.10 | 5 | 10 | 5 | 40 | 5 | 52 |

In addition to the foregoing, the stiffening time at 220 degrees F. is lengthened over that obtainable with a practical percentage of modified starch when the improved retarder of the present invention is employed. Thus, for example, use of the above composition of 0.06 per cent modified starch together with 0.10 per cent of maleic acid, gave a typical stiffening time of three hours and fifteen minutes at 220 degrees F.

Experience has shown that considerable variation in percentages are permissible with the improved retarder of the present invention using Portland cement compositions other than that represented above. Generally speaking the effective percentage ranges of each component of the modified starch - maleic acid retarding mixture of the present invention may vary to the full workable limits of each retarder used separately. These limits are approximately 0.02 per cent to 0.18 per cent for modified starch, and 0.04 per cent to 0.40 per cent for the maleic acid.

It is found in practice that great flexibility in the properties of the cement mixture is obtainable by using modified starches of differing degrees of conversion in the retarding mixture. For example, a particular A. S. T. M. Type I cement (standard Portland) normally gives a relatively long stiffening time at 140 degrees F. using the neat unretarded slurry. In practicing the present invention, a low modified starch would be selected for retarding this cement in order that the stiffening time at that temperature would not be too prolonged. By proportioning this type of modified starch with maleic acid using percentages that would fall within the ranges noted above, the stiffening time at The following stiffening times (Table V), were observed for these temperatures:

TABLE V

| Temp., °F. | Additive | Percent | Stiffening Time Hr. | Stiffening Time Min. |
|---|---|---|---|---|
| 100 | Mod. Starch plus Maleic Acid | 0.06 0.10 | 7 | 40 |
| 140 | do | 0.10 | 5 | 10 |
| 180 | do | 0.10 | 5 | 40 |
| 200 | do | 0.10 | 5 | 52 |
| 220 | do | 0.10 | 3 | 15 |

A series of tests was made to determine what effects these retarders would have on the strength of the set cement slurry. Two inch cubes were molded from slurries containing 100 parts by weight of cement and 40 parts by weight of water and were cured at 180 degrees F. The results of these tests are indicated by Table VI below:

TABLE VI

*Compressive strength (lb. per sq. in.) 180° F. curing temperature*

| Additive | Percent | 24-hour | 3-day | 7-day |
|---|---|---|---|---|
| (Neat Slurry) | | 5,158 | 7,300 | 6,929 |
| Maleic Acid | 0.30 | 5,025 | 6,504 | 6,828 |
| Modified Starch | 0.10 | 4,597 | 9,417 | 10,710 |
| Maleic Acid plus Modified Starch | 0.10 0.06 | 5,179 | 7,329 | 8,625 |

The maleic acid apparently does not greatly increase or decrease the strength of set cement slurry. The modified starch, due to its initial retardation, apparently causes a decrease of strength at 24 hours, but at longer periods is effective in causing greatly increased strengths. Results similar to these, with an addition of modified starch to A. S. T. M. Type II cement have been obtained repeatedly, and Table VI may be considered as being typical. The maleic acid-modified starch mixture gives strengths in the set cement comparable to the neat slurry at 24 hours and at 3 days, but at 7 days, it effects an appreciable increase in strength.

From the foregoing, it will be seen that maleic acid in itself is an effective retarder for stiffening times of cement slurries, and that close and valuable control of such stiffening times is effected through the conjoint use of maleic acid and modified starch, whereby substantially equal times are obtainable at the temperatures encountered in oil well operations.

It will be understood that while the preferred retarding composition is made up of substantially 0.06 per cent of modified starch and 0.10 per cent of maleic acid, such percentages may be varied within the ranges indicated hereinabove without excessive impairment of effectiveness, the exact composition of the retarder being dependent to a considerable extent on the particular composition of the Portland cement being employed. It will be understood, in fact, that considerable variation in percentages may be required in adapting the improved retarding composition of the invention to Portland cements of different compositions; and accordingly that it is intended and desired to embrace within the scope of this invention such modifications and changes as may be required to adapt it to various conditions and uses, as defined in the appended claims. It will be understood also that the term "modified starch" as used in the claims is meant the "thin boiling starches" and "oxidized starches" of commerce in which the processing has not progressed to the extent of producing products which are completely soluble in cold water as is the case with water-soluble dextrins and dextrose.

I claim:

1. A cement composition for cementing oil wells having all of the characteristic properties of Portland cement except for a retarded setting rate that is substantially equal for temperatures within a range of between approximately 140 degrees F. and approximately 200 degrees F., the said composition consisting principally of Portland cement and an effective quantity of a retarding agent for retarding the stiffening rate of the said cement at the said temperatures, the retarding agent being composed of maleic acid and modified starch, the maleic acid and starch being proportioned to effect approximately equal stiffening times for the cement composition at elevated temperatures within the said range.

2. A cement composition suitable for cementing deep oil wells, containing Portland cement as its principal ingredient and the sole ingredient that hardens upon hydration, and an effective quantity of a set-retarding agent for retarding the stiffening rate of the said cement at elevated temperatures, the said retarding agent being composed of maleic acid and modified starch, the maleic acid being present in amounts of from approximately 0.04 per cent to 0.4 per cent by weight of the cement, and the modified starch being present in amounts of from approximately 0.02 per cent to approximately 0.18 per cent by weight of the said cement.

3. A cement composition suitable for cementing deep oil wells, containing Portland cement as its principal ingredient and the sole ingredient that hardens upon hydration, and an effective amount of a stiffening-retarding agent for retarding the stiffening rate of the said cement at elevated temperatures and for producing a retarded setting rate that is substantially equal for temperatures within a range of between approximately 140 degrees F. and approximately 200 degrees F., the said retarding agent being composed of maleic acid and modified starch, the maleic acid being present in approximately 0.1 per cent by weight of the cement, and the modified starch being present in approximately 0.06 per cent by weight of the said cement.

4. A process of mixing a cement slurry for cementing an oil well, comprising mixing water with a composition containing Portland cement as the sole ingredient that hardens upon hydration, and an effective amount of a retarder composed of maleic acid and modified starch for retarding the stiffening rate of the cement at elevated temperatures, the maleic acid and modified starch being proportioned in amounts to give approximately equal stiffening times at temperatures between 140 degrees F. and 200 degrees F.

5. A process of mixing a cement slurry for cementing an oil well, comprising mixing water with a composition containing Portland cement as the sole ingredient that hardens upon hydration, and an effective amount of a retarder composed of maleic acid and modified starch for retarding the stiffening rate of the cement at elevated temperatures, the maleic acid being present in amounts of from approximately 0.04 per cent to 0.4 per cent by weight of the cement, and the modified starch being present in amounts of from approximately 0.02 per cent to approximately 0.18 per cent by weight of the said cement, the maleic acid and modified starch being proportioned in amounts to give approximately equal stiffening times of the cement at temperatures between 140 degrees F. and 200 degrees F.

6. A process of preparing a cement composition for cementing a deep oil well, comprising incorporating with Portland cement of the composition an effective amount of a retarder composed of maleic acid and modified starch for materially retarding the stiffening rate of the cement at elevated temperatures.

7. A process of preparing a cement composition for cementing a deep oil well, comprising incorporating with Portland cement of the composition an effective amount of a retarder composed of maleic acid and modified starch for retarding the stiffening time of the Portland cement at elevated temperatures, the maleic acid being present in amounts of from approximately 0.04 per cent to approximately 0.4 per cent of the Portland cement and the modified starch being present in amounts of from approximately 0.02 per cent to approximately 0.18 per cent by weight of the said cement.

NORMAN C. LUDWIG.

REFERENCES CITED

The following references are of record in the file of this patent:

UNITED STATES PATENTS

| Number | Name | Date |
| --- | --- | --- |
| 2,211,368 | Dickens | Aug. 13, 1940 |
| 2,374,628 | Swayze | Apr. 24, 1945 |

FOREIGN PATENTS

| Number | Country | Date |
| --- | --- | --- |
| 405,508 | Great Britain | 1934 |